United States Patent
Kataoka et al.

(10) Patent No.: US 7,557,732 B2
(45) Date of Patent: Jul. 7, 2009

(54) VEHICLE DEVIATION PREVENTING CONTROL DEVICE

(75) Inventors: Hiroaki Kataoka, Susono (JP); Seiji Kawakami, Susono (JP); Katsuhiko Iwazaki, Nishikamo-gun (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 6 days.

(21) Appl. No.: 11/887,817

(22) PCT Filed: May 30, 2006

(86) PCT No.: PCT/JP2006/311168

§ 371 (c)(1),
(2), (4) Date: Oct. 4, 2007

(87) PCT Pub. No.: WO2006/129834

PCT Pub. Date: Dec. 7, 2006

(65) Prior Publication Data

US 2008/0278349 A1  Nov. 13, 2008

(30) Foreign Application Priority Data

May 31, 2005  (JP) .............................. 2005-160576

(51) Int. Cl.
*G08G 1/01* (2006.01)
(52) U.S. Cl. ..................... 340/933; 340/435; 340/436; 340/438; 340/573.7
(58) Field of Classification Search ................. 340/933
See application file for complete search history.

(56) References Cited

U.S. PATENT DOCUMENTS

| 6,732,021 | B2 * | 5/2004 | Matsumoto et al. | 340/435 |
| 7,391,304 | B2 * | 6/2008 | Kataoka et al. | 340/435 |
| 2002/0041229 | A1 | 4/2002 | Satoh et al. | |
| 2004/0183663 | A1 * | 9/2004 | Shimakage | 340/436 |
| 2004/0252020 | A1 * | 12/2004 | Matsumoto et al. | 340/438 |
| 2005/0236210 | A1 * | 10/2005 | Kawazoe et al. | 180/272 |
| 2005/0265579 | A1 * | 12/2005 | Nishida | 382/103 |
| 2007/0069874 | A1 * | 3/2007 | Huang et al. | 340/435 |

FOREIGN PATENT DOCUMENTS

EP  1 407 916 A2  4/2004

(Continued)

OTHER PUBLICATIONS

Katsuhiko Iwazaki et al., U.S. Appl. No. 11/134,301, filed May 23, 2005.

(Continued)

*Primary Examiner*—George A Bugg
(74) *Attorney, Agent, or Firm*—Oliff & Berridge, PLC

(57) ABSTRACT

A vehicle speed V is compared with a threshold Vth; when V is less than Vth, TLC is set to an initial value $t_0$; when V is not less than Vth, TLC is set shorter with increase in V. Then TLC is compared with a predetermined value t th, and when TLC is less than t th, TLC is replaced by t th being a lower limit. This improves compatibility between a reduction in an occurrence frequency of needless warnings and a guarantee of a deviation margin time.

4 Claims, 10 Drawing Sheets

FOREIGN PATENT DOCUMENTS

| | | |
|---|---|---|
| JP | A 07-105498 | 4/1995 |
| JP | A 08-16998 | 1/1996 |
| JP | A 2002-079895 | 3/2002 |
| JP | A 2002-104015 | 4/2002 |
| JP | A 2003-141695 | 5/2003 |
| JP | A 2003-337998 | 11/2003 |
| JP | A-2004-070383 | 3/2004 |
| JP | A 2004-341610 | 12/2004 |

OTHER PUBLICATIONS

Katsuhiko Iwazaki et al., U.S. Appl. No. 11/134,318, filed May 23, 2005.

Seiji Kawakami et al., U.S. Appl. No. 11/136,450, filed May 25, 2005.

Seiji Kawakami et al., U.S. Appl. No. 11/135,287, filed May 24, 2005.

Hiroaki Kataoka et al., U.S. Appl. No. 11/138,307, filed May 27, 2005.

Satoru Niwa et al., U.S. Appl. No. 11/136,449, filed May 25, 2005.

Chumsamutr Rattapon et al., U.S. Appl. No. 11/138,432, filed May 27, 2005.

* cited by examiner

VEHICLE DEVIATION PREVENTING CONTROL DEVICE

TECHNICAL FIELD

The present invention relates to a vehicle deviation prevention control apparatus arranged to detect a driving lane on which a host vehicle is driving, to estimate a path of the host vehicle, to determine whether the host vehicle will deviate from the driving lane, and, with a determination of a deviation, to issue a warning to a driver to prompt avoidance of the deviation.

BACKGROUND ART

There is a known technology of acquiring a road image in front of a vehicle with a camera mounted on the vehicle, detecting a driving lane on which the host vehicle is driving, by image processing, determining a possibility that the host vehicle will deviate from the driving lane, based on the detected driving lane information and an estimated path of the host vehicle, and, with a high possibility of a deviation, issuing a warning to a driver to prompt avoidance of the deviation by a steering operation or the like (e.g., cf. Japanese Patent Application Laid-Open No. 7-105498).

This technology is, for example, to determine a point of the deviation from the driving lane, based on an offset, a yaw angle, a curve radius, etc. of the driving lane and a yaw rate, a steering angle, a vehicle speed, etc. of the host vehicle, and to predict a state of the deviation on the basis of a distance between the foregoing point and the host vehicle and an angle between the estimated path at the point and a partition line of the driving lane.

In the foregoing technology, a deviation warning is issued when the distance between the predicted deviation point and the host vehicle is smaller than a distance threshold set nearly in proportion to the vehicle speed. As this distance threshold is set nearly in proportion to the vehicle speed, a predicted arrival time to the predicted deviation point (deviation prediction time) is kept approximately constant to guarantee a margin time for execution of a deviation avoidance operation.

DISCLOSURE OF THE INVENTION

Incidentally, in order to guarantee the time enough for the driver to perform an appropriate deviation avoidance operation, it is preferable to secure a sufficient deviation margin time or deviation prediction time. On the other hand, if the deviation prediction time is set long, needless warnings will frequently occur, so as to cause the driver to feel troublesome. The needless warnings include false warnings due to errors in detection of the driving lane and in estimation of the path, and also include useless warnings issued in spite of situations in which the driver can recognize a possibility of deviation by himself without any warning and correct the path to avoid the deviation. If the deviation prediction time is shortened in order to reduce the occurrence frequency of needless warnings, it will lead to a failure in guaranteeing the operation margin time enough to avoid the deviation in case of a correct warning. Namely, the reduction in the occurrence frequency of needless warnings and the guarantee of the deviation margin time are in a trade-off relation. It was, therefore, a general technique to set the deviation prediction time approximately constant as in the foregoing technology.

However, even if the deviation prediction time is set approximately constant in the estimation of deviation, the occurrence frequency of needless warnings will differ depending upon differences of various detection errors and road circumstances. Conventionally, the deviation prediction time was set without consideration to this difference in the occurrence frequency of needless warnings depending upon circumstances.

An object of the present invention is therefore to provide a vehicle deviation prevention control apparatus improved in compatibility between the reduction in the occurrence frequency of needless warnings and the guarantee of the deviation margin time.

In order to achieve the above object, a vehicle deviation prevention control apparatus according to the present invention is (1) a vehicle deviation prevention control apparatus comprising: driving lane detecting means for detecting a driving lane on which a vehicle is driving; and deviation determining means for determining whether the vehicle will deviate from the driving lane after a lapse of a predetermined time; and adapted to issue a warning to a driver, with a determination of a deviation, (2) the vehicle deviation prevention control apparatus having means for detecting a vehicle speed, wherein the deviation determining means sets the predetermined time shorter when the vehicle speed is high than when the vehicle speed is low.

The vehicle deviation prevention control apparatus is arranged to determine whether the vehicle will deviate from the driving lane, based on the position of the vehicle after a lapse of the predetermined deviation prediction time (predetermined time) and the detected driving lane, and to issue a warning. This predetermined time or deviation prediction time is set shorter when the vehicle speed is high than when the vehicle speed is low. As the vehicle speed increases, influence of yaw angle noise in the driving lane information also increases to become unignorable. According to the present invention, the deviation prediction time is set shorter within the scope in which frequent occurrence of needless warnings due to the influence of the yaw angle noise can be suppressed and in which the deviation margin time is guaranteed.

This predetermined time is preferably set including a term inversely proportional to the vehicle speed. This is because the influence of yaw angle is in a relation of inverse proportion to the vehicle speed.

Another vehicle deviation prevention control apparatus according to the present invention may be the vehicle deviation prevention control apparatus of (1) having: means for detecting a vehicle speed; and range deciding means for deciding a detection range of the driving lane detecting means; wherein the deviation determining means sets the predetermined time, based on the range decided by the range deciding means, and the vehicle speed.

In a case where the range of the driving lane directly detectable by the driving lane detecting means is limited (e.g., where the driving lane is detected by acquiring a forward image and image processing it), if deviation prediction time× vehicle speed is large, the relation between the driving lane and the predicted vehicle position must be compared beyond the directly detectable range. In this case, the conventional technique adopted is to extend the directly detected driving lane and predict the driving lane, based thereon. However, this technique produces a significant discrepancy between the actual driving lane and the predicted driving lane, particularly, in a curvature-varying zone (clothoid zone) or at an entrance or exit of a curve. When the predetermined time is set taking account of the detection range of the driving lane detecting means and the vehicle speed, the deviation determination operation can be performed in a state in which such discrepancy is small.

Another vehicle deviation prevention control apparatus is the vehicle deviation prevention control apparatus of (1) having range deciding means for deciding a detection range of the driving lane detecting means, wherein the deviation determining means performs the deviation determination operation while defining as a target the driving lane within the range decided by the range deciding means. Since this vehicle deviation preventing apparatus is arranged to perform the deviation determination operation in the detection range of the driving lane detecting means, no discrepancy is produced with the aforementioned predicted driving lane.

Furthermore, the vehicle deviation prevention control apparatus is preferably arranged as follows: it has vehicle position predicting means for predicting an arrival position of the vehicle after a lapse of the predetermined time; when the arrival position of the vehicle predicted is outside the range decided by the range deciding means, the deviation determining means performs the deviation determination operation to determine a deviation at a point of time when the vehicle arrives near a limit of the detection range.

According to the present invention, the deviation determination operation is performed based on the positional relation between the driving lane and the arrival position of the vehicle after a lapse of the predetermined time when the predicted arrival position of the vehicle after a lapse of the predetermined time is within the range; when it is determined to be outside the range, the deviation determination operation is performed based on the positional relation at the point of time when the vehicle arrives near the limit of the detection range, i.e., the positional relation between the position of the vehicle upon the arrival near the limit and the driving lane in the limit part of the detection range.

Another vehicle deviation prevention control apparatus is the vehicle deviation prevention control apparatus of (1) having means for acquiring lane width information of a road on which the vehicle is driving, wherein the deviation determining means sets the predetermined time, based on the acquired lane width information. This predetermined time is preferably set smaller with decrease in the lane width.

In general, a driver often drives a vehicle on the right or on the left, instead of the center of the lane, as recognizing surrounding vehicles and obstacles. In such cases, even if an offset amount is approximately equal from the center of the lane, the distance to a partition line will differ depending upon the lane width; therefore, if the same predetermined time is set, the occurrence frequency of needless warnings will increase on narrow roads. When the predetermined time is set based on the lane width, such frequent occurrence of needless warnings is suppressed.

In practical control, a control delay is produced in each of periods of detecting vehicle state quantities and ambient circumstances, performing the detection of the driving lane and the estimation of the path using them, carrying out the estimation of deviation, issuing a warning, and implementing the avoidance operation based on driver's execution of the deviation avoidance operation. If the deviation prediction time is set extremely short at high speeds taking no account of such control delay, the sufficient avoidance operation will not be implemented to cause the driver to feel a delay in warning timing. Therefore, the predetermined time is preferably set including a term taking account of the control delay, and a lower limit larger than 0 is preferably set for the predetermined time.

BEST MODE FOR CARRYOUT OUT THE INVENTION

The preferred embodiments of the present invention will be described below in detail with reference to the accompanying drawings. For easier understanding of description, identical components will be denoted by the same reference symbols throughout the drawings as much as possible, without redundant description.

Figure 1:
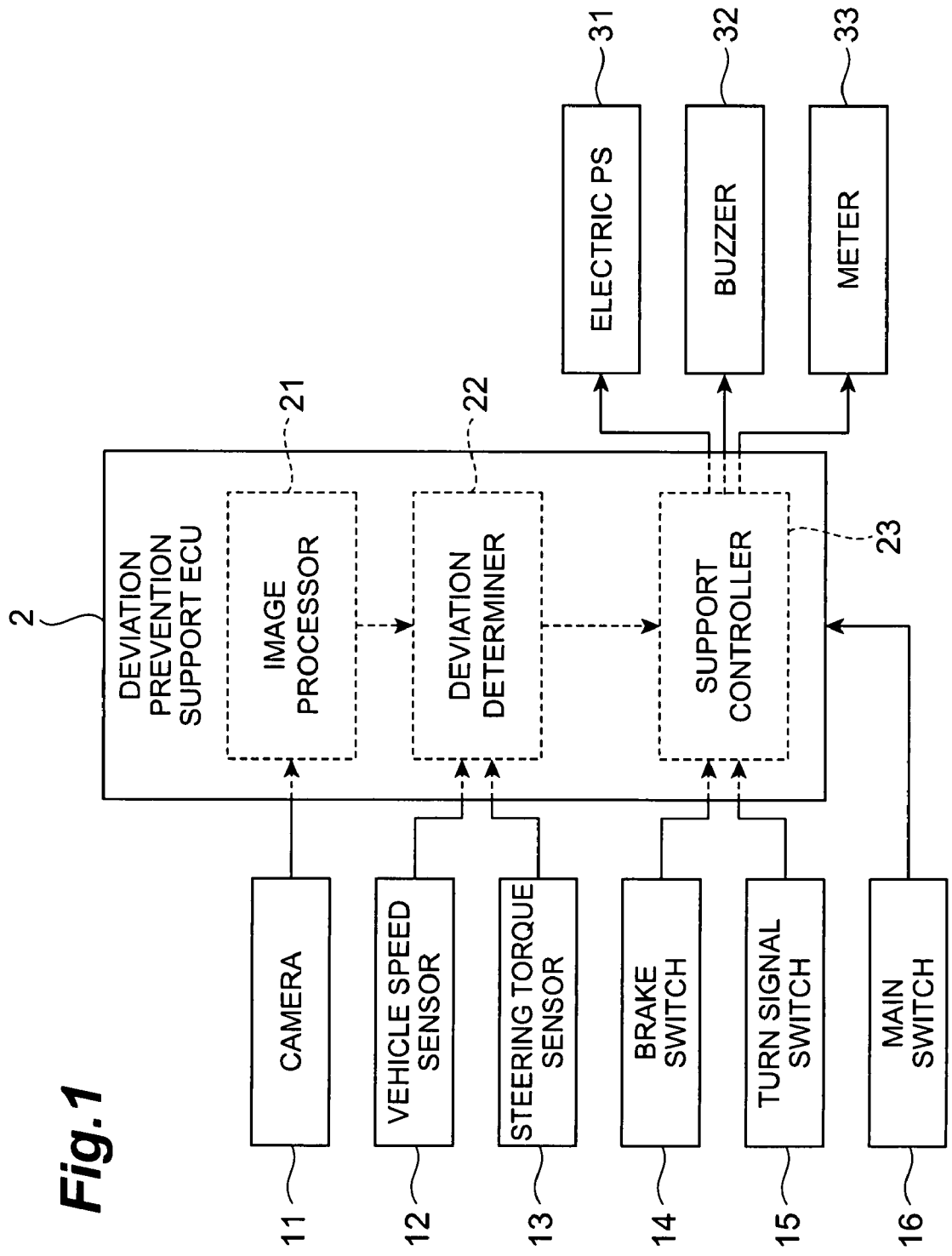
FIG. 1 is a block configuration diagram of a vehicle deviation prevention control apparatus according to the present invention.
Figure 2:
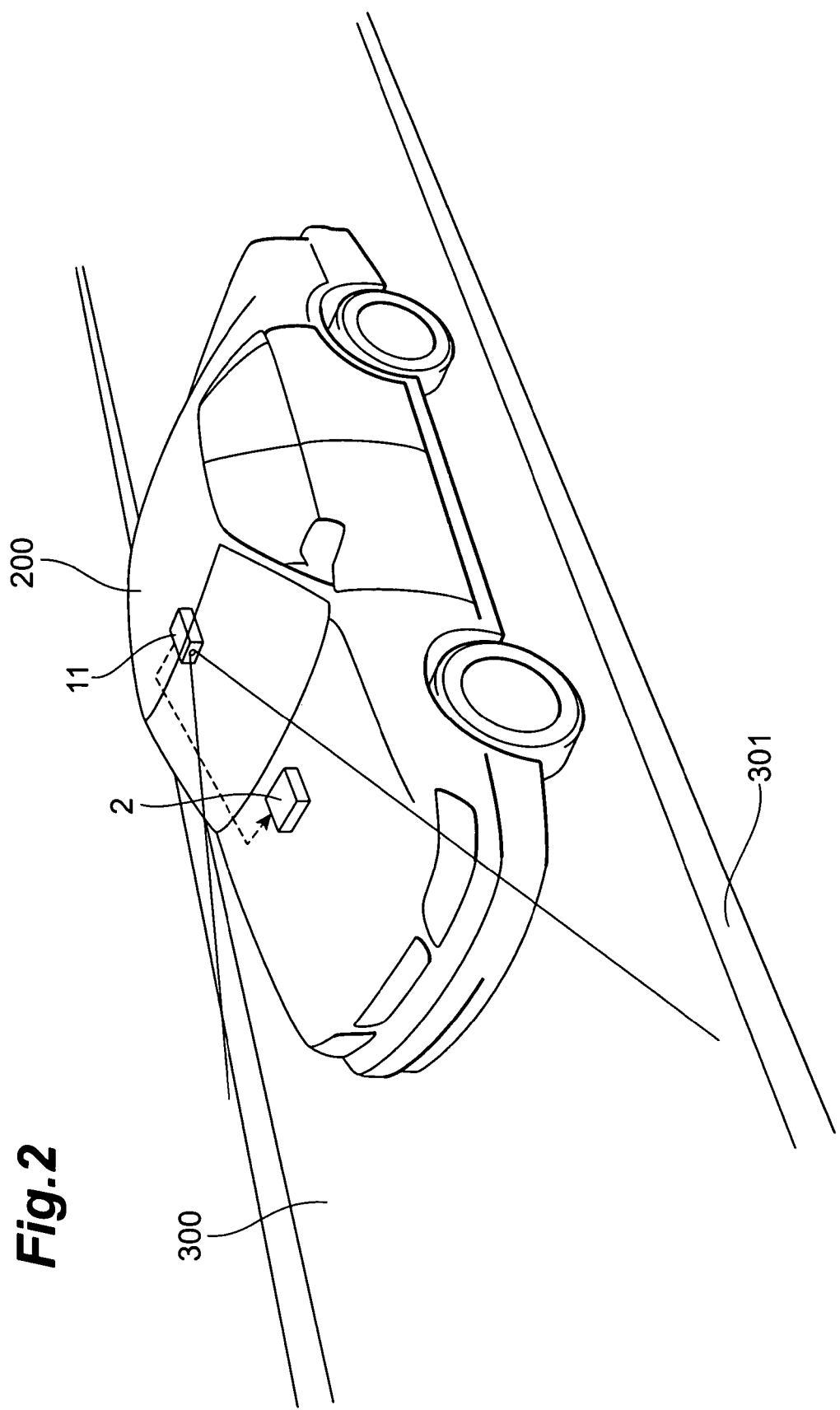
FIG. 2 is a perspective view showing a vehicle equipped with the control apparatus of FIG. 1.

FIG. 1 is a block configuration diagram of a vehicle deviation prevention control apparatus according to the present invention and FIG. 2 a perspective view showing a vehicle equipped with the control apparatus. This vehicle deviation prevention control apparatus (which will be referred to hereinafter simply as the control apparatus) 100 is composed mainly of a deviation prevention support ECU 2. This deviation prevention support ECU 2 is comprised of a combination of a CPU, a ROM, a RAM, other memory devices, etc., and is provided with an image processing part 21, a deviation determining part 22, and a support controlling part 23. Each of the parts 21-23 may be sectionalized on a hardware basis, or they may be sectionalized on a software basis while sharing hardware in part or in whole, or they may be comprised of a plurality of software applications sharing part of each, or they may be parts of one software application.

The image processing part 21 performs image processing to recognize road partition lines (which can be white lines or yellow lines drawn on roads, blocks placed on or buried in roads, or the like and which will be referred to hereinafter simply as white lines) defining the both edges of a driving lane on which the host vehicle is driving, from image information acquired by a camera 11 for acquiring an image in front of the vehicle, thereby recognizing the driving lane, and outputs the recognized driving lane information (curve R, offset, yaw angle, and the like).

The deviation determining part 22 estimates a predicted arrival position of the host vehicle after a predetermined time from vehicle speed information acquired by a vehicle speed sensor 12 (e.g., wheel speed sensors located at the respective wheels) and steering torque information acquired by a steering torque sensor 13 (which is located on a steering shaft and which detects a steering torque exerted by a driver), and determines a possibility of deviation of the vehicle from the driving lane, based on the predicted arrival position and the driving lane information recognized by the image processing part 21.

The support controlling part 23 is a control part that performs a deviation prevention support, based on the result of the determination by the deviation determining part 22, and in the present embodiment the support controlling part 23 issues a warning to the driver, as a deviation prevention support. An electric power steering system (PS) 31, a buzzer 32, and a meter 33 are connected as warning means to the support controlling part 23. The support controlling part 23 also receives output signals from a brake switch 14 and from a turn signal switch 15.

An output signal from a main switch 16 is fed to the deviation prevention support ECU 2 to permit the driver to switch permission/prohibition of execution of the deviation prevention support.

The camera 11 is located in the upper part of the front windshield of vehicle 200 (e.g., on the back side of a rearview mirror) as shown in FIG. 2, and acquires an image ahead the vehicle 200, i.e., an image of a driving lane 300 ahead the vehicle (including white lines 301). The camera 11 may be located anywhere (e.g., in the front part of the vehicle body) on the vehicle body as long as it can capture the image ahead the vehicle.

First, the basic operation of the control apparatus 100 of the present invention will be described in a situation in which the main switch 16 is set on.

The camera 11 first acquires a moving picture ahead the vehicle, for example, at the TV frame rate and outputs the moving picture to the image processing part 21. The image processing part 21 performs image recognition processing using a known image processing technique such as edge detection, to recognize positions of the white lines 301 at the two edges of the driving lane 300, and outputs predetermined white line recognition information.

The deviation determining part 22 obtains a predicted arrival position a certain deviation prediction time (TLC: Time to lane crossing) later on the basis of the vehicle information acquired by the vehicle speed sensor 12 and the steering torque sensor 13, determines whether the vehicle will be located within the driving lane 300 at the time TLC (i.e., whether the vehicle will deviate from the driving lane), based on the predicted arrival position and the white line recognition information acquired from the image processing part 21, and, when it determines that the vehicle will deviate from the driving lane 300, it outputs the determination of the deviation possibility to the support controlling part 23.

When the support controlling part 23 receives the information indicating the deviation possibility, from the deviation determining part 22, it activates the buzzer 32, displays the information at a pertinent location in the meter 33, and actuates an electric motor of the electric PS 31 to exert a predetermined warning torque on the steering wheel, thereby notifying the driver of a risk of the deviation. When the driver is in a braking operation (i.e., when the brake switch 14 is on), or when the driver manipulates a direction indicator for change of lane or for preparation for a right or left turn or the like (i.e., when the turn signal switch 15 is on), the support controlling part determines that there is no need for notifying the driver of the risk of deviation, and performs none of the various warnings.

Figure 3:
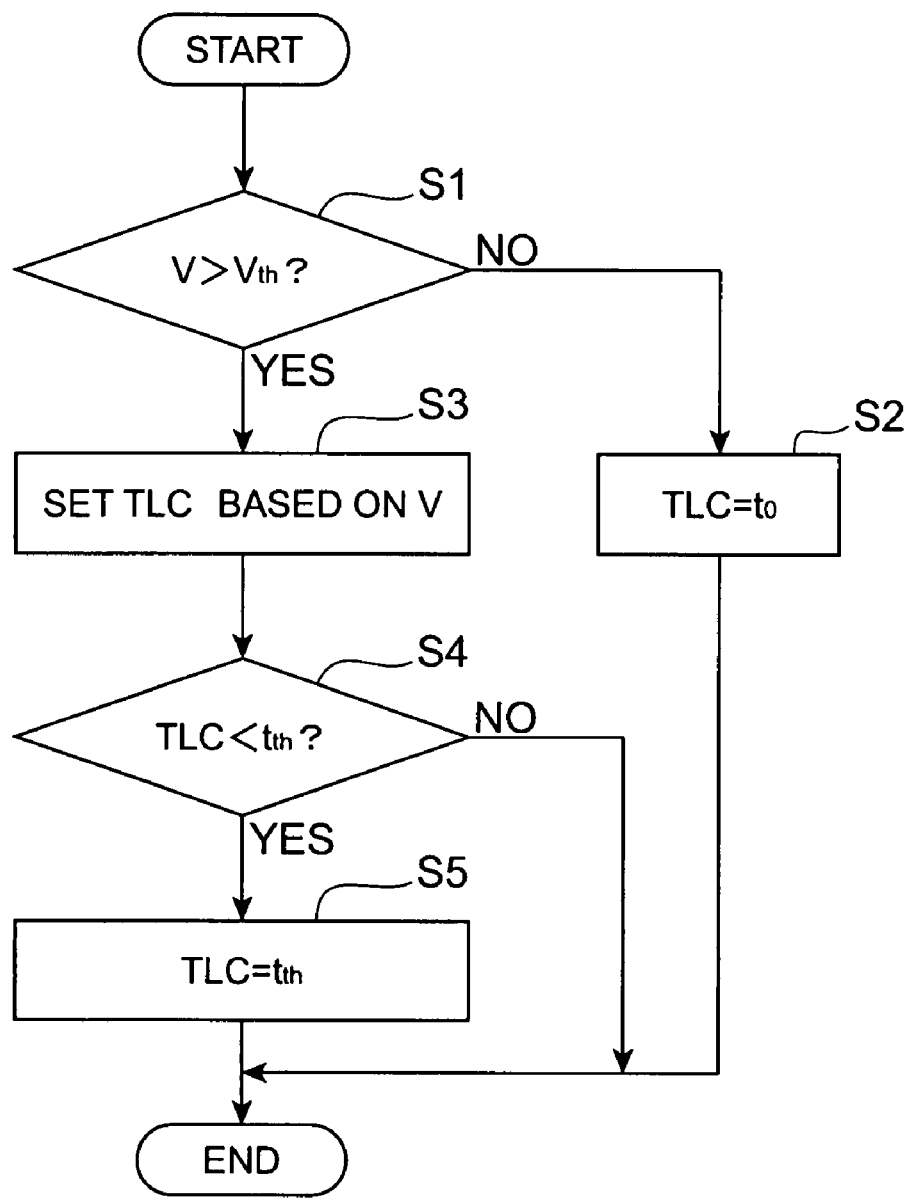
FIG. 3 is a flowchart for explaining a first setting technique of TLC in the apparatus of FIG. 1.

In the present embodiment, TLC is not constant but set variable. FIG. 3 is a flowchart showing the first setting processing technique. The first step is to determine whether the vehicle speed V is not less than a predetermined threshold Vth (step S1). When the vehicle speed V is less than the threshold Vth, the flow moves to step S2 to set TLC to to being an initial value, and then the processing is terminated.

On the other hand, when the vehicle speed V is not less than the threshold Vth, TLC is set based on the vehicle speed V (step S3). TLC is set shorter with increase in the vehicle speed V in this example; specifically, it is set as TLC=$K_1$/V+$K_2$. In this equation, $K_1$ is a positive constant and $K_2$ is a coefficient taking account of a processing time in the processing system and communication system and a delay of the control system.

Figure 4:
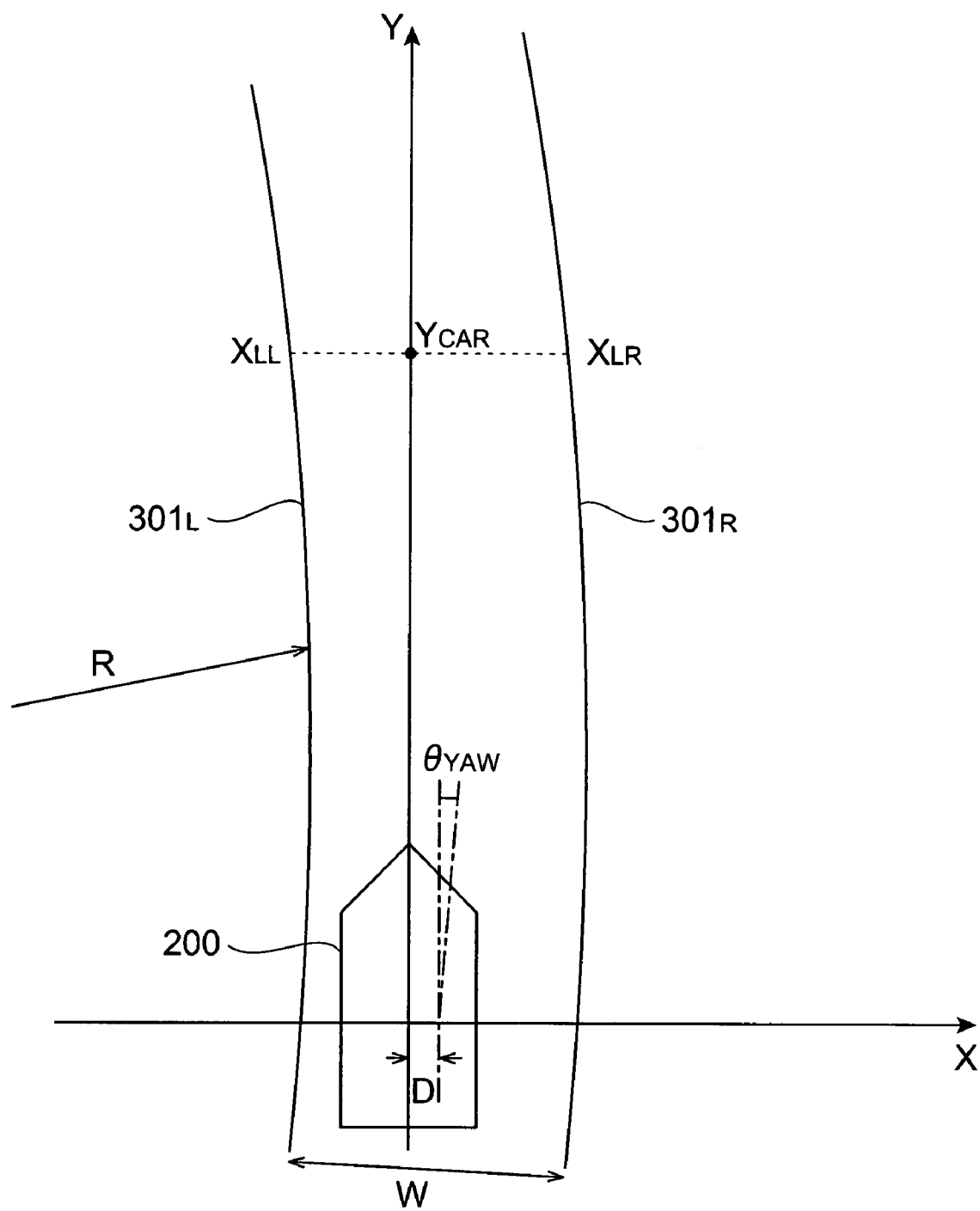
FIG. 4 is a drawing showing an XY coordinate system with an origin at a center of gravity of a vehicle.

In the setting of TLC, using the term inversely proportional to the vehicle speed is effective, particularly, in restraining the influence of yaw angle noise. Specifically, let us consider an XY coordinate system in which an origin is set at a center of gravity of the vehicle at present, a y-axis is set along the anteroposterior direction, and an x-axis is set along a transverse direction (cf. FIG. 4). Defining vehicle speed V, yaw angle $\theta_{YAW}$, curve R, lane width W, and offset D, a Y-directional position of the vehicle after a lapse of TLC, $Y_{CAR}$, and left and right white line positions $X_{LL}$, $X_{LR}$ at the Y-directional position are represented by Eqs. (1)-(3) below.

$$Y_{CAR} = \frac{TLC \times V}{3.6} \quad (1)$$

$$X_{LL} = X_{LLnow} + X_{YAW} + X_{RAD} \quad (2)$$
$$= D - \frac{W}{2} + \theta_{YAW} \times Y_{CAR} + \frac{Y_{CAR}^2}{2R}$$

$$X_{LR} = X_{LRnow} + X_{YAW} + X_{RAD} \quad (3)$$
$$= D + \frac{W}{2} + \theta_{YAW} \times Y_{CAR} + \frac{Y_{CAR}^2}{2R}$$

In these equations, $X_{LLnow}$, $X_{LRnow}$ are the left and right white line positions at the present time, $X_{YAW}$ is an X-directional displacement based on the yaw angle of the lane, and $X_{RAD}$ is an X-directional displacement based on the curve. In Eq. (1), 3.6 is a unit transformation coefficient from the unit [km/h] into [m/s] of the vehicle speed V. A noise component $\Delta\theta_{YAW}$ upon detection of the yaw angle $\theta_{YAW}$ produces an error in the left and right white line positions $X_{LL}$, $X_{LR}$ as it is multiplied $Y_{CAR}$ times, as seen from Eqs. (2) and (3). Since $Y_{CAR}$ itself is proportional to the vehicle speed V as indicated in Eq. (1), the errors due to the noise component $\Delta\theta_{YAW}$ in the calculation of the left and right white line positions $X_{LL}$, $X_{LR}$ will increase as the vehicle speed V increases, provided that TLC is constant. Therefore, TLC is set nearly in proportion to the vehicle speed to keep the Y-directional position $Y_{CAR}$ of the vehicle approximately constant, whereby the influence of the yaw angle noise $\Delta\theta_{YAW}$ is reduced in the calculation of the left and right white line positions $X_{LL}$, $X_{LR}$.

After the setting, it is determined whether TLC is less than a predetermined value t th (step S4). When TLC is not less than t th, the processing is directly terminated. When TLC is less than t th, TLC is replaced by t th and then the processing is terminated (step S5). Namely, t th functions as a lower limit of TLC. This t th is the sum of $K_2$ taking account of the control delay, and a lower limit (a positive value) of the value set based on the vehicle speed.

When TLC at high speeds is set shorter than TLC at low speeds, the influence of the yaw angle noise can be restrained at high speeds. If TLC at high speeds is set long, the Y-directional position $Y_{CAR}$ of the vehicle after a lapse of TLC will be farther from the current vehicle position. If the vehicle is in passage in a zone in which the curvature of the road is varying (e.g., a clothoid zone, an approach from a straight course to a curve zone, or the converse), the accuracy of the determination on the lane deviation could deteriorate due to the difference of the curvature of the road to the vehicle position after a lapse of TLC; whereas the present invention involves performing the determination operation at a relatively near road position from the current vehicle position at high speeds as well, whereupon the determination operation can be accurately performed while suppressing the deterioration of the determination accuracy. This allows the apparatus to achieve reduction in the needless warnings and the warning delay. Furthermore, since TLC can be set sufficiently long in the low speed region, a sufficient deviation margin time can be guaranteed, so as to improve safety.

The deviation prediction time is set including the time taking account of the control delay, and the lower limit is set for it, which alleviates the driver's uncomfortable feeling due to the delay of warning timing. This lower limit is set to obtain such timing that a deviation warning is securely issued to the driver before the vehicle actually drives over a white line, even with consideration to the control delay.

In the above example the term $K_2$ taking account of the delay of the control system was set at the time of the initial setting of TLC, but it is also possible to adopt the following way: TLC is first calculated based on only the term taking account of the vehicle speed, not including the term corresponding to $K_2$; it is compared with a lower limit (positive value) based on the vehicle speed; when it is not more than the lower limit, TLC is set to the lower limit; thereafter the term $K_2$ taking account of the control delay is further added to obtain final TLC.

Figure 5:
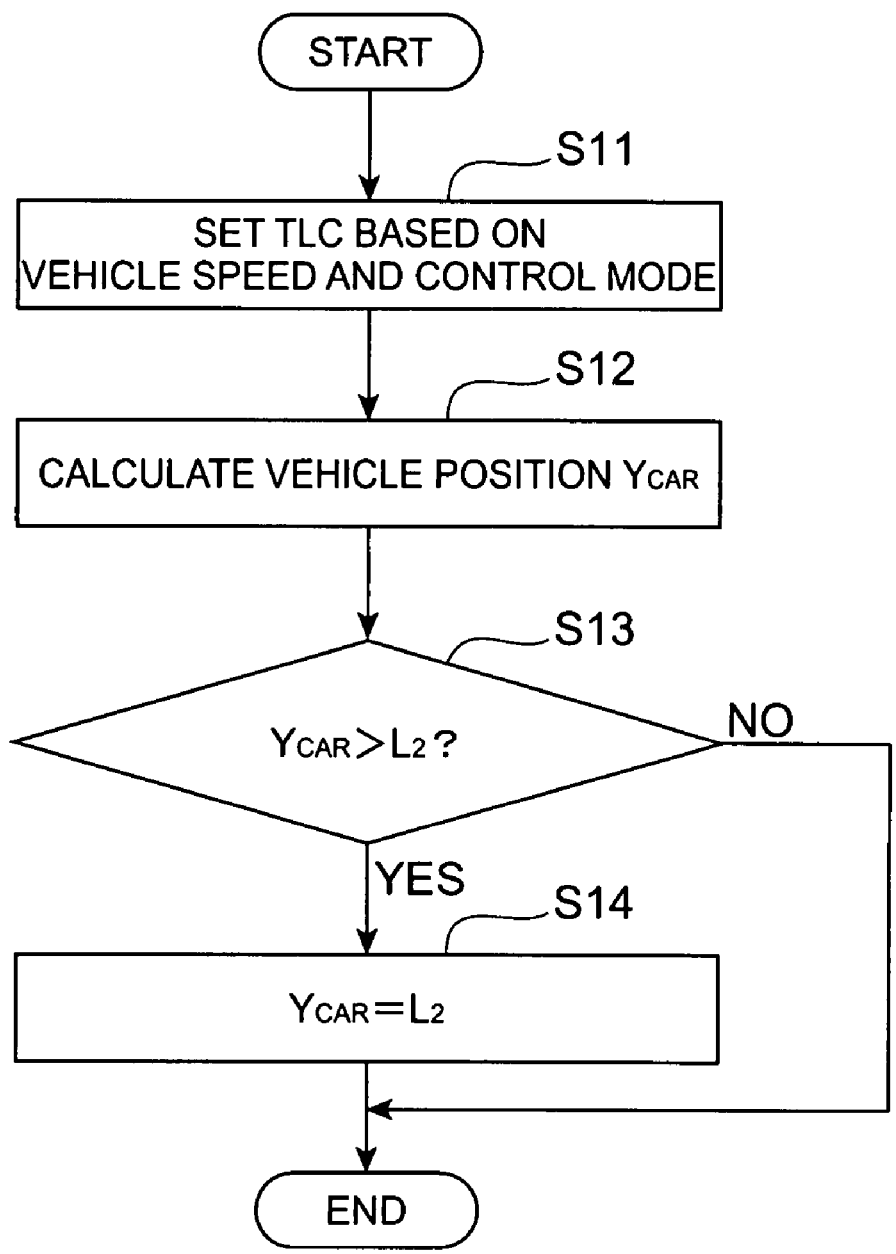
FIG. 5 is a flowchart for explaining a second setting technique of TLC in the apparatus of FIG. 1.

Next, the second setting technique of TLC will be described. FIG. 5 is a flowchart showing this processing, FIG. 6 a drawing for explaining the cause of a needless warning and a warning delay occurring during an approach from a straight course to a curve course, and FIG. 7 a diagram showing a distance-curvature change on the road of FIG. 6.

Figure 6:
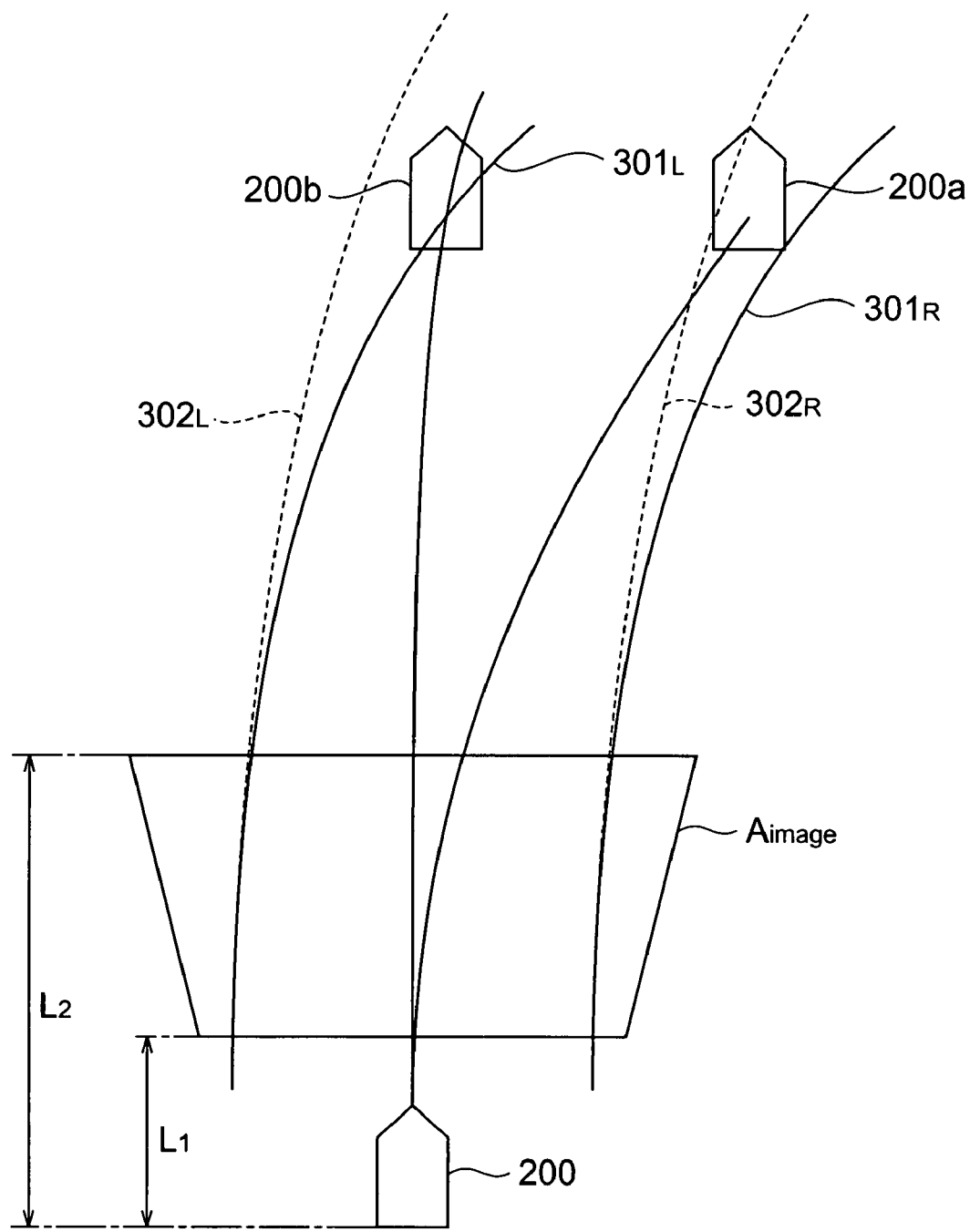
FIG. 6 is a drawing for explaining a needless warning and warning delay occurring during an approach from a straight course to a curve course.
Figure 7:
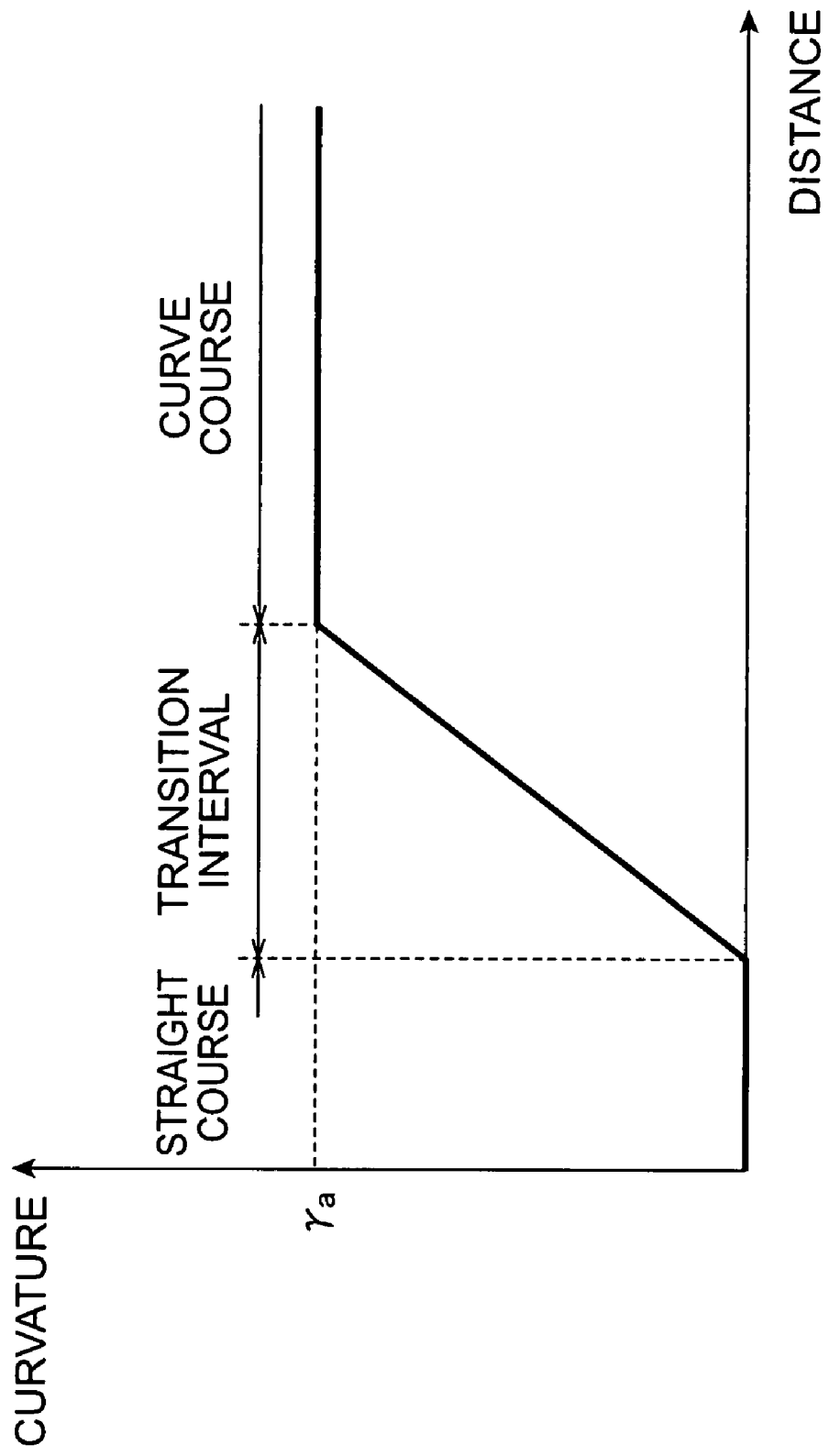
FIG. 7 is a diagram showing a distance-curvature change on the road of FIG. 6.

The camera 11 used herein is one whose field angle and direction are fixed, and, as shown in FIG. 6, an imaging range $A_{image}$ thereof is limited to a range of predetermined distances (L1-L2) ahead the vehicle 200. Here L1 is approximately several meters and L2 is approximately 20-30 m. At the location of the approach from the straight course to the curve course, the road curvature γ has a transition interval in which the curvature varies at a constant curvature change rate, between an interval of steady curvature $\gamma_a$ and the straight course, as shown in FIG. 7, instead of an intermittent curvature change in which the curvature is switched at a certain position from the zero curvature to the steady curvature $\gamma_a$ of the curve course.

When such a transition interval is present in the imaging range $A_{image}$, the image processing part 21 outputs the white line recognition information of the imaging range $A_{image}$, and thus the curve R of the transition interval is outputted as the white line recognition information. When TLC is long and the predicted vehicle position is located far ahead this imaging range $A_{image}$, the curve at the predicted white line positions 302L, 302R (which are indicated by dashed lines in FIG. 6) used in the deviation determination operation becomes gentler than that at actual white line positions 301L, 301R (which are indicated by solid lines in FIG. 6) and is shifted closer to the straight travel direction from the curve direction. If the discrepancy is so large between the predicted white line positions and the actual white line positions, a false warning (needless warning) to cause a determination of lane deviation will occur in the case of predicted vehicle position 200a where the vehicle will actually be driving within the white lines, and a warning delay to cause a delay in the lane deviation determination will occur in the case of predicted vehicle position 200b where the vehicle will deviate from the white line.

In the second setting technique this discrepancy is restrained between the predicted white line positions and the actual white line positions. The first step is to set TLC, based on the vehicle speed and a control mode (step S11). This setting may be, for example, one based on the first setting technique.

The next step is to calculate the vehicle position $Y_{CAR}$ after TLC according to the aforementioned Eq. (1) (step S12). It is then determined whether the calculated position $Y_{CAR}$ is over the imaging range, specifically, farther than $L_2$ (step S13). When $Y_{CAR}$ is not more than $L_2$, the calculated position is within the imaging range, and thus the subsequent step is skipped to terminate the processing. When $Y_{CAR}$ is over $L_2$, $Y_{CAR}$ is set to $L_2$ (step S14) and the processing is terminated. Instead of setting $Y_{CAR}$, TLC may be set so that $Y_{CAR}$ becomes $L_2$. In this case, TLC=$3.6 \times L_2/V$, based on Eq. (1).

This causes the deviation determination operation to be always executed within the imaging range. For this reason, the discrepancy is suppressed between the predicted white line positions and the real white line positions, and it can restrain occurrence of the needless warning and warning delay due to this discrepancy.

Figure 8:
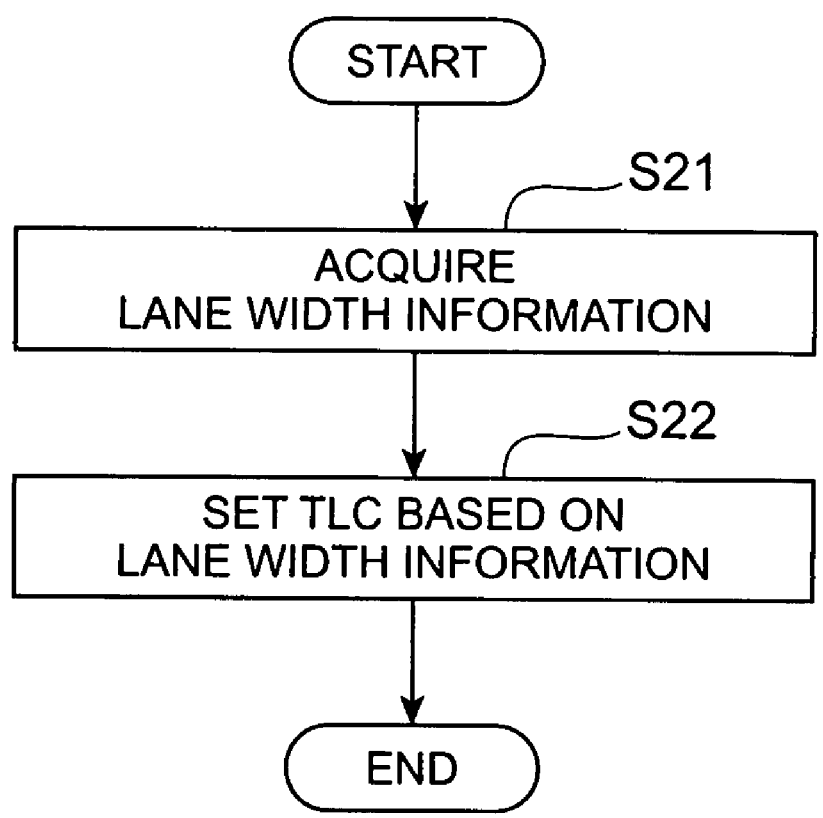
FIG. 8 is a flowchart for explaining a third setting technique of TLC in the apparatus of FIG. 1.

Subsequently, the third setting technique of TLC will be described. FIG. 8 is a flowchart illustrating this third setting technique. The first step is to acquire lane width information of a driving lane on which the host vehicle is driving. (step S21). This lane width information can be calculated, for example, from the white line recognition information acquired in the image processing part 21.

Figure 9:
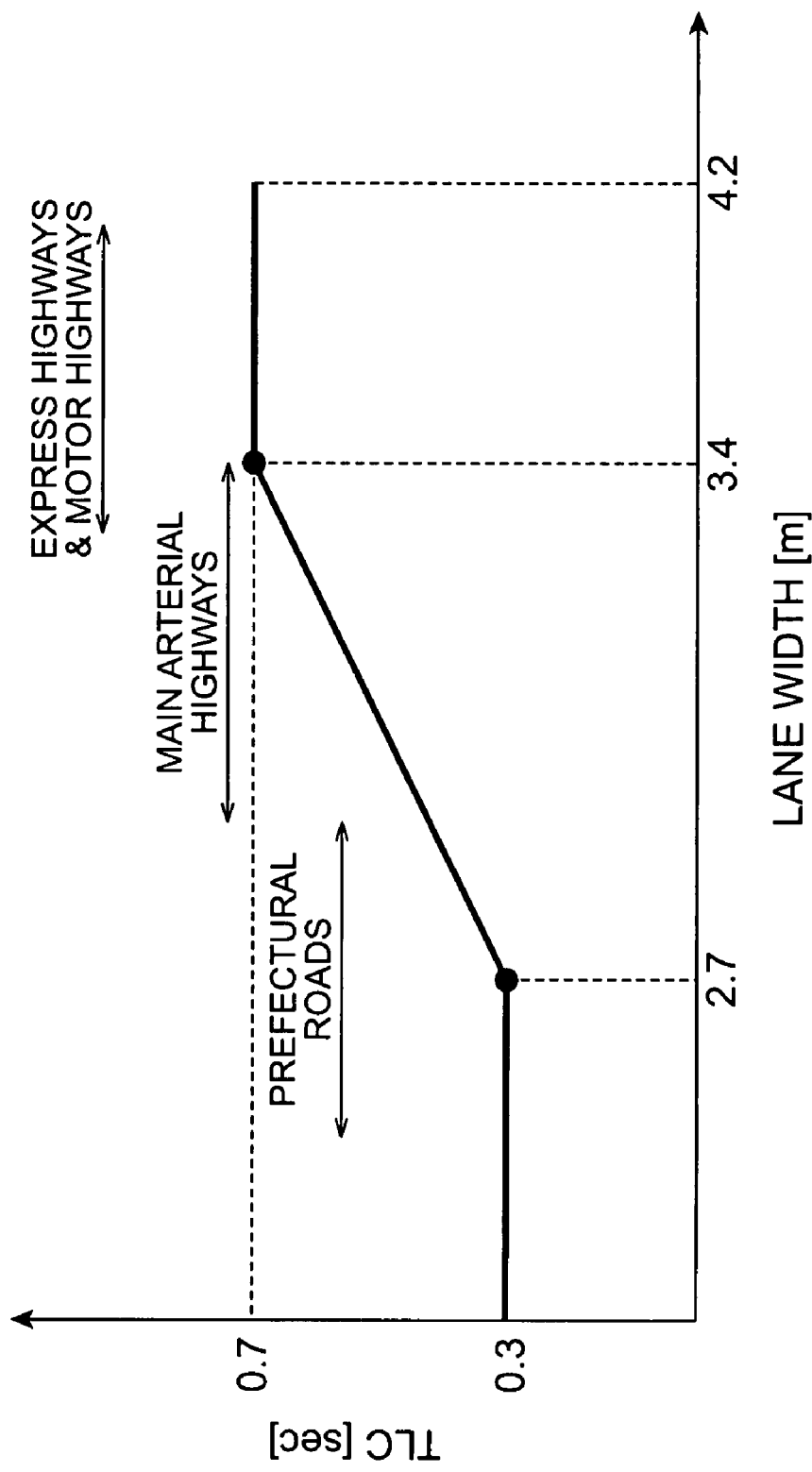
FIG. 9 is a graph showing a setting example of TLC according to a lane width.

The next step is to set TLC on the basis of the lane width (step S22) and the processing is then terminated. FIG. 9 is a graph showing a setting example of TLC according to the lane width. In general a driver in driving of a vehicle tends to drive intentionally a little to the right or to the left in a lane while recognizing surrounding vehicles such as opposing vehicles and parallel running large-size vehicles and obstacles such as pedestrians, bicycles, parked cars on the road, or electric poles, instead of keeping on driving in the center of the lane. As a result, there are many cases where the vehicle drives near white lines on narrow roads. By shortening TLC for narrow roads as shown in FIG. 9, it is feasible to restrain occurrence of the needless warning during driving near white lines. By setting TLC long for driving on wide roads, on the other hand, it is feasible to guarantee a sufficient deviation margin time. This expands the support region.

TLC herein is the value taking account of the control delay, as in the case of the first setting technique, and is set so that the minimum is larger than 0 in the case where the control delay is not taken in account.

The above described the example in which the lane width information of the driving lane on which the host vehicle is driving was acquired by the image processing from the image acquired with the camera 11, but the lane width information may be acquired from a navigation system. It is also possible to acquire the lane width information by road-vehicle communication or the like. The lane width information stated herein is assumed to contain a type of a road, in addition to the lane width itself. The lane width is wide for motor highways such as express highways, the lane width is narrower for main arterial highways which are not the motor highways, and the lane width is much narrower for prefectural roads and municipal roads than it (cf. FIG. 9). Therefore, much the same effect can be achieved when the lane width is determined on the basis of the type of the road. In this case, for example, TLC is set relatively long for motor highways, and TLC is set short for the other roads. This switching does not always have to be two stages, but may be stepwise switching in several stages according to types of roads.

Figure 10:
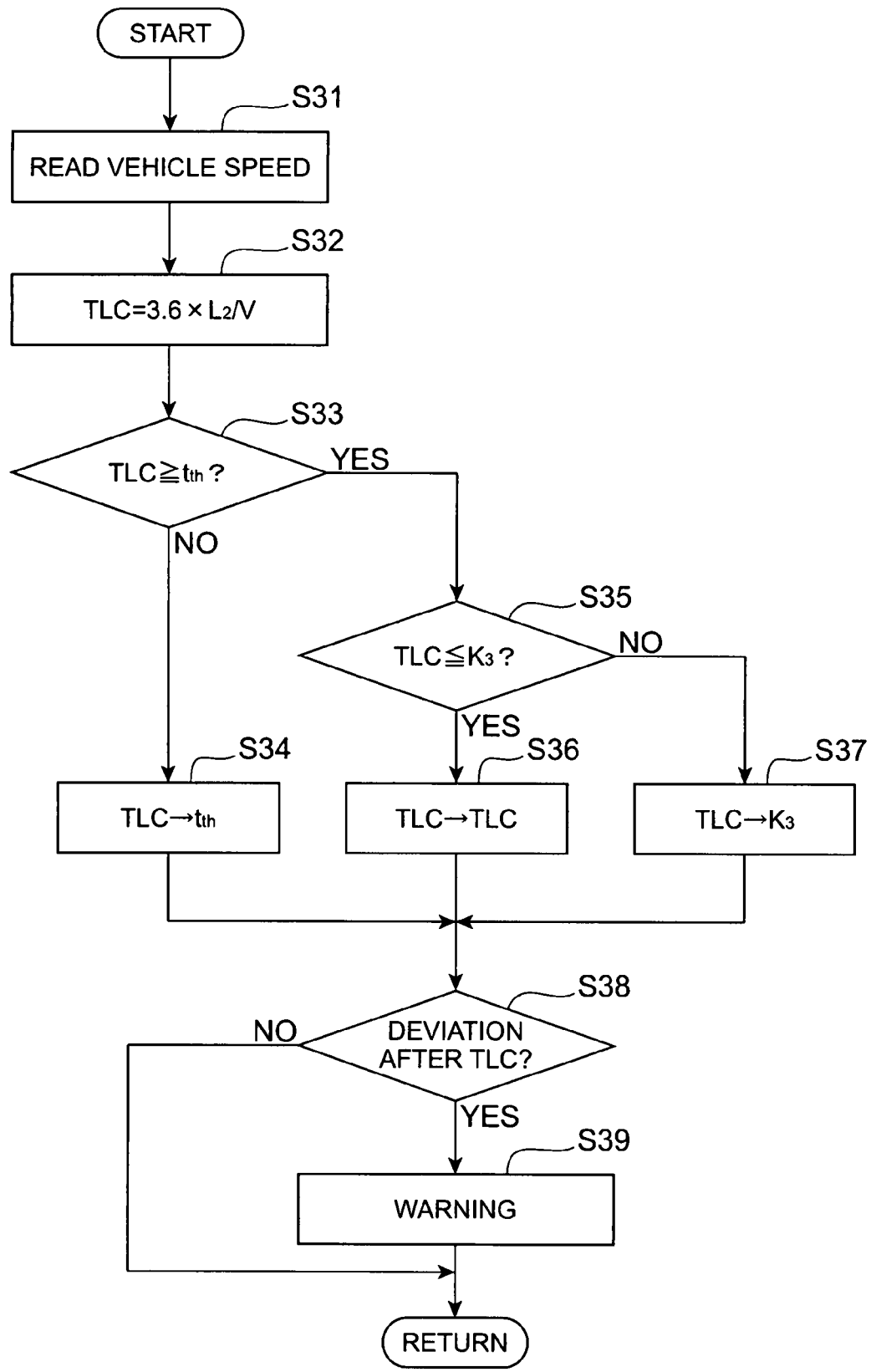
FIG. 10 is a flowchart for explaining a fourth setting technique of TLC in the apparatus of FIG. 1.

Next, the fourth setting technique of TLC will be described. FIG. 10 is a flowchart illustrating the fourth setting technique. The first step is to read the vehicle speed information (step S31) and the subsequent step is to set TLC on the basis on the vehicle speed (step S32). TLC set herein is one set so that $Y_{CAR}$ coincides with the far-side position $L_2$ of the imaging range $A_{image}$. Namely, it is set as TLC=3.6×$L_2$/V.

The next step is to compare TLC with the lower limit t th (step S33). This lower limit t th is equal to that in the first setting technique. When TLC is less than the lower limit t th, TLC is replaced by the lower limit t th (step S34). When TLC is not less than the lower limit t th, it is further compared with the upper limit $K_3$ (step S35). This $K_3$ is set based on a time range in which a future position can be predicted with a predetermined accuracy from a current vehicle behavior, in order to suppress an error determination. When TLC is not more than the upper limit $K_3$, TLC set previously is maintained as it is (step S36); when it is over the upper limit $K_3$, TLC is replaced by the upper limit $K_3$ (step S37). Then the deviation determination operation is carried out on the basis of TLC redefined (step S38). When the deviation possibility is determined to be high, the flow goes to step S39 to issue a predetermined warning, and then the processing is terminated. This setting technique permits TLC to be directly determined from the vehicle speed and the imaging range of the camera.

INDUSTRIAL APPLICABILITY

According to the present invention, the deviation prediction time at high speeds is set to the small value, and this permits the apparatus to restrain the influence of recognition error of the driving lane (particularly, the yaw angle noise) on the determination and execution of the deviation determination operation outside the detection range of the driving lane detecting means. For this reason, the occurrence of the needless warning can be restrained, so as to improve the reliability of the warning for the driver. On the other hand, a sufficient deviation margin time is guaranteed at low speeds.

Furthermore, as the detection range of the driving lane detecting means is decided, the deviation prediction time is set based on the detection range and the vehicle speed, or the deviation determination operation is performed within the detection range; it prevents occurrence of the needless warning due to deviation from the predicted driving lane in the clothoid zone or at an entrance or exit of a curve, and thus improves the reliability of the warning for the driver.

Another technique is to change the deviation prediction time using the lane width information, whereby the deviation determination operation can be performed in accord with road circumstances. Particularly, the deviation prediction time is set shorter for narrow lane widths than for wide lane widths; it reduces occurrence of needless warnings on the narrow roads while guaranteeing a sufficient deviation margin time on the wide roads.

The invention claimed is:

1. A vehicle deviation prevention control apparatus comprising: driving lane detecting means for detecting a driving lane on which a vehicle is driving; and deviation determining means for determining whether the vehicle will deviate from the driving lane after a lapse of a predetermined time; and adapted to issue a warning to a driver, with a determination of a deviation, the vehicle deviation prevention control apparatus having means for acquiring lane width information of a road on which the vehicle is driving, wherein the deviation determining means sets the predetermined time, based on the acquired lane width information.

2. The vehicle deviation prevention control apparatus according to claim 1, wherein the predetermined time is set smaller with decrease in the lane width.

3. The vehicle deviation prevention control apparatus according to claim 1, wherein the predetermined time is set taking account of a control delay.

4. The vehicle deviation prevention control apparatus according to claim 1, wherein a lower limit larger than 0 is set for the predetermined time.

* * * * *